Oct. 12, 1926.

C. M. SEMLER

FENDER LIGHT

Filed August 4, 1924

1,603,216

INVENTOR.
CLYDE M SEMLER
BY
ATTORNEY.

Patented Oct. 12, 1926.

1,603,216

UNITED STATES PATENT OFFICE.

CLYDE M SEMLER, OF AKRON, OHIO.

FENDER LIGHT.

Application filed August 4, 1924. Serial No. 729,894.

This invention relates to fender lights for vehicles.

The chief object of the invention is to provide a fender light so constructed that a ring or torus of rubber or other material in simulation of a pneumatic, cushion or solid tire may be mounted thereon for advertising or other purposes.

Another object thereof is to provide a simple and inexpensive but effective means for providing a monogram or the like in the transparent face of the light.

The invention will be best understood by a consideration of the accompanying drawings in connection with the following brief description, it being understood that while the foregoing and other objects are obtained in the specific structure here shown and described, the invention is not limited to the same.

Figure 1:
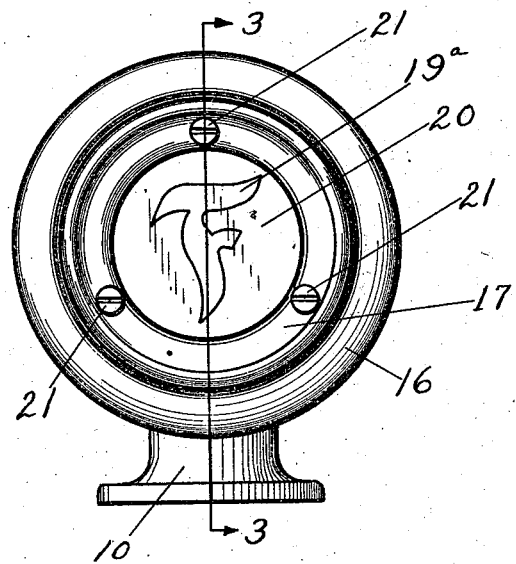
Figure 1 is a front elevation of a fender light embodying the invention.
Figure 3:
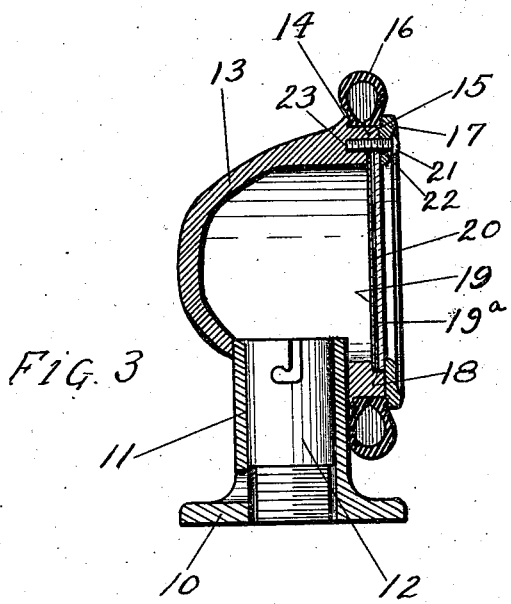
Figure 3 is a section on line 3—3 of Figure 1.
Figure 2:
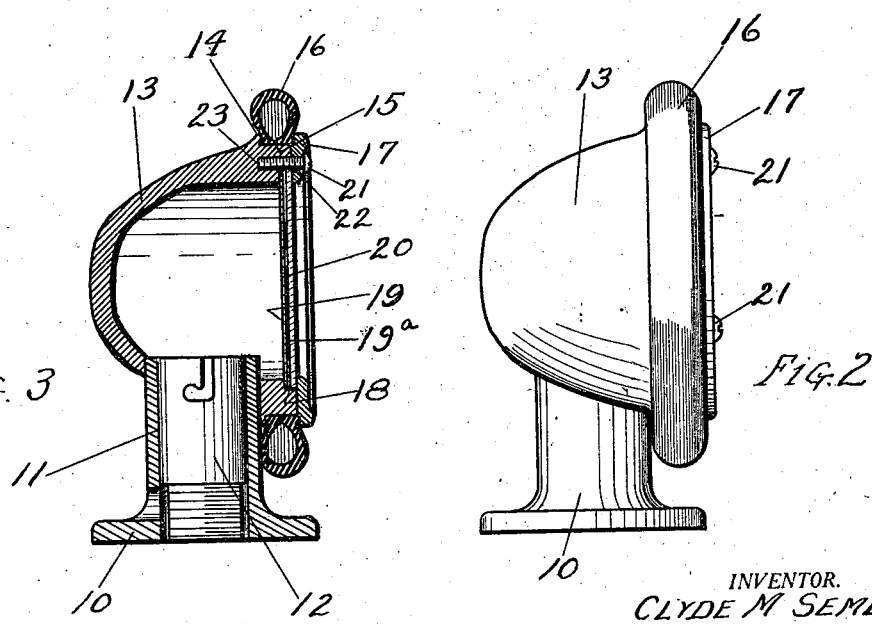
Figure 2 is a side elevation thereof.

Referring to the drawings, 10 is a base so formed as to adapt the light for mounting on the fender of a vehicle. The base 10 is formed with a cylindrical bore 11 for slidably receiving the usual bayonet socket or receptacle 12 for a bayonet base electric lamp. Secured on the base 10 is a light casing 13 having a generally parabolical, cylindrical outer surface. The casing 13 is formed with a circumferential flange 14 adjacent and parallel to its front edge, said flange, in effect, defining a rim 15 on which a torus 16, preferably of rubber, is adapted to be received. The torus 16 may be, for example, in simulation of a pneumatic tire casing or a cushion or solid tire, as desired.

For demountably securing the torus 16 on the rim 15, a removable flange ring 17 may be employed. In the preferred form of the invention, the casing 13 is formed with a front edge having a reduced portion forming a shoulder 18 about its inner periphery whereby a seat will be formed for a disc 19 of colored celluloid or the like, the disc being colored either red or green depending on whether the light is used on the left or right fender, and a disc 20 of plain glass. On the disc of celluloid, there may be secured a monogram, as indicated at 19$^a$, cut from paper or the like, having an adhesive back surface. It will be understood, of course, that a single disc of plain or colored transparent material may be used in place of discs 19 and 20 and that the monogram may be secured thereon or formed in the material of the disc. The flange ring 17 is then made of such dimensions as to secure both the torus and the discs 19 and 20 in place. For securing the ring 17 to the casing 13, screws 21, 21 may be used, the screws being inserted through apertures 22 in the ring and into threaded sockets 23 in the front edge of casing 13.

It will be understood from the foregoing that a simple but effective device has been provided whereby a fender light may be beautified and at the same time employed for advertising purposes without entailing any considerable expense in the manufacture of the same.

Modifications of the invention may be resorted to without departing from the spirit thereof or the scope of the appended claim.

I claim:

A light for vehicles comprising a casing, a circumferential shoulder on the casing, a translucent disc seated on said shoulder, a rim about the casing adapted to receive a ring in simulation of a tire, and a flange ring adapted to secure said disc and said tire on the casing.

CLYDE "M" SEMLER.